(12) United States Patent
Keller et al.

(10) Patent No.: US 11,558,308 B2
(45) Date of Patent: Jan. 17, 2023

(54) METHOD FOR AGGREGATING AND REGULATING MESSAGES VIA A CONSTRAINED BIDIRECTIONAL COMMUNICATION CHANNEL

(71) Applicant: AVANTIX, Aix-en-Provence (FR)

(72) Inventors: Christophe Keller, Marseilles (FR); Patricia Richard, Aix en Provence (FR)

(73) Assignee: AVANTIX, Aix-en-Provence (FR)

( * ) Notice: Subject to any disclaimer, the term of this patent is extended or adjusted under 35 U.S.C. 154(b) by 0 days.

(21) Appl. No.: 17/506,625

(22) Filed: Oct. 20, 2021

(65) Prior Publication Data

US 2022/0124048 A1    Apr. 21, 2022

(30) Foreign Application Priority Data

Oct. 21, 2020  (EP) ..................................... 20306252

(51) Int. Cl.
| | |
|---|---|
| *H04L 12/863* | (2013.01) |
| *H04L 12/58* | (2006.01) |
| *H04L 12/865* | (2013.01) |
| *H04L 47/62* | (2022.01) |
| *H04L 47/6275* | (2022.01) |
| *H04L 51/226* | (2022.01) |

(52) U.S. Cl.
CPC ...... *H04L 47/6215* (2013.01); *H04L 47/6275* (2013.01); *H04L 51/226* (2022.05)

(58) Field of Classification Search
CPC ............. H04L 47/6215; H04L 47/6275; H04L 51/226; H04L 47/24
See application file for complete search history.

(56) References Cited

U.S. PATENT DOCUMENTS 6,341,134 B1   1/2002 Toutain et al.
2005/0195821 A1*  9/2005 Yun ....................... H04L 47/196
                                                      370/392

(Continued)

FOREIGN PATENT DOCUMENTS

| FR | 2762735 A1 | 10/1998 |
|---|---|---|
| WO | 2017119950 A1 | 7/2017 |

OTHER PUBLICATIONS

European Search Report issued in EP20306252.6, dated Apr. 1, 2021 (8 pages).

*Primary Examiner* — Abdulkader M Alriyashi
(74) *Attorney, Agent, or Firm* — Arc IP Law, PC; Joseph J. Mayo

(57) ABSTRACT

A method for aggregating and regulating messages in a network that has a plurality of pairs of nodes and two transmitting/receiving devices communicating via a bidirectional channel. The method is implemented by each of the transmitting/receiving devices. Each received message may be segmented into packets of a predefined size, and each packet may be allocated to a queue that depends on the origin, the destination, and the priority of the message. One or more frames may then be created, and packets of the queues may be inserted into the frames. Frames may then be sent via the bidirectional channel over a predefined time interval, the number of frames sent over the time interval being dependent on the maximum throughput of the channel and on the useful throughput in each of the transport directions of the channel.

14 Claims, 3 Drawing Sheets

(56) References Cited

U.S. PATENT DOCUMENTS

| | | | |
|---|---|---|---|
| 2005/0207436 A1* | 9/2005 | Varma | H04L 47/628 370/412 |
| 2007/0036168 A1* | 2/2007 | Hsiao | H04L 47/621 370/412 |
| 2012/0327779 A1* | 12/2012 | Gell | H04L 47/2475 370/235 |
| 2020/0358704 A1* | 11/2020 | Anafi | H04L 47/2441 |

* cited by examiner

METHOD FOR AGGREGATING AND REGULATING MESSAGES VIA A CONSTRAINED BIDIRECTIONAL COMMUNICATION CHANNEL

This application claims priority to European Patent Application Number 20306252.6, filed 21 Oct. 2020, the specification of which is hereby incorporated herein by reference.

BACKGROUND OF THE INVENTION

Field of the Invention

The technical field of the invention is that of telecommunications and more specifically that of communications via constrained bidirectional channels.

One or more embodiments of the invention relate to a method for aggregating and regulating messages via a constrained bidirectional communication channel.

Description of the Related Art

The secure communication networks of the state of the art have constraints which are overcome by so-called "conventional" communication networks. Such secure communication networks use limited throughput communication channels.

In multi-point communications through gateways to these secure networks or between these secure networks, the communication channels are very busy and have a limited throughput. Thus, at the level of a communication channel between two nodes of one or two secure networks, bottlenecks appear: the packets from several points must pass through this limited throughput communication channel to reach their destination points, causing an increase in the latency of exchanges in the network(s), and potentially loss of packets. Further, it is necessary to manage the priority of these packets, certain packets having a minimum latency to be respected in order to reach their recipient due to the importance of the data they contain.

Different systems and methods for multiplexing and managing packets have been proposed in the state of the art. For example, FR2762735A1 relates to a method for scheduling packets with equitable losses in a high throughput services integration type network, for example in an ATM (Asynchronous Transfer Mode) network. In FR2762735A1, several flows are multiplexed to a node using FIFO (First In First Out) type queues, each queue having a minimum fixed throughput, the flow packets being used in queues so that the K ratio of the part of the throughput allocated beyond the minimum throughput on the part of the instantaneous throughput beyond the minimum throughput is fixed at all times. Thus, each flow is processed fairly in the scheduling of its packets, each flow having the same loss when the maximum throughput is reached. This solution does not make it possible to prevent packet losses and cannot therefore be applied to a secure network. Further, this solution only concerns the sending of data over a unidirectional channel; it does not therefore apply to a bidirectional channel.

It is therefore necessary to have a solution enabling, in a point-to-point network comprising a bidirectional channel, the transport of packets in the bidirectional channel without congestion by managing the various packet priorities.

BRIEF SUMMARY OF THE INVENTION

The invention offers a solution to the aforementioned problems, by facilitating management of the network message priorities and of the real-time throughput in each direction of the bidirectional channel by virtue of a message multiplexing function together with a regulation function of the message traffic.

One aspect of the invention thus relates to a method for aggregating and regulating messages in a network comprising:
 a plurality of nodes split into pairs of nodes, each pair of nodes comprising two nodes of the plurality of nodes and
 at least two transmitting/receiving devices, the two transmitting/receiving devices communicating via a bidirectional channel having a defined maximum throughput, the bidirectional channel enabling the transport of data in a first direction and in a second direction opposite to the first direction, each direction having a useful throughput, each transmitting/receiving device defining queues, each pair of nodes of the plurality of pairs of nodes having a plurality of queues allocated, each plurality of queues allocated to a pair of nodes comprising at least a first and a second queue, the first queue having a high priority, the second queue having a lower priority than the first queue,
 the method being implemented by each of the two transmitting/receiving devices, the method comprising the steps of:
 receiving a plurality of messages, each message of the plurality of messages coming from a node of the plurality of nodes belonging to a pair of nodes and being intended for another node of the plurality of nodes belonging to the same pair of nodes,
 segmentation of each message into packets of a predefined size,
 allocation of each packet resulting from the segmentation to a queue depending on the origin, the destination and a priority of the message,
 creation of a first frame and, if necessary, at least a second frame, the frames having a predefined size, and insertion of packets of queues into at least the first frame and, if necessary, in the at least one second frame, the insertion of packets allocated to the highest priority queue being performed before the insertion of packets allocated to the lowest priority queue, the insertion being performed initially in the first frame then, if necessary, in the at least one second next frame,
 sending, via the bidirectional channel over a predefined time interval, of the first frame then, if necessary, of the at least one second frame, the frames being sent successively, the number of frames sent over the time interval being dependent on the maximum throughput of the bidirectional channel and on the useful throughput in each of the transport directions of the bidirectional channel.

Thanks to one or more embodiments of the invention, it is possible to manage the throughputs in each direction in a constrained bidirectional channel as well as the priorities of the messages. In fact, the data aggregation function advantageously manages the segmentation of messages into packets, the allocation of packets to queues based on their priority, the insertion of packets of priority queues in the frames sent first in the constrained bidirectional channel, and the regulation function advantageously manages the throughput in each direction of the constrained bidirectional channel by adjusting, in real time, the number of frames to be sent in each predefined time interval.

"If necessary" is understood to mean that additional frames are created and packets are inserted in these additional frames created if the total size of the packets to be sent is greater than the predefined size of the frames already created.

In addition to the features mentioned in the preceding paragraph, the method according to one aspect of the invention may have one or more complementary features from the following, taken individually or according to all technically plausible combinations:

the messages have a maximum predefined size by priority, and at the step for allocating packets to a queue based on the priority, if the size of the message to which the packets belong exceeds the maximum size for the priority, the packets of the message are allocated to the priority queue directly below the priority queue to which they were allocated at the step for sending frames via the bidirectional channel, the number of frames sent over the time interval is increased if the sum of the useful throughput of the two transport directions of the bidirectional channel is less than the maximum throughput of the bidirectional channel. Thus, the use of the bidirectional channel and therefore the throughput of the bidirectional channel are optimized in real-time or near real-time.

the useful throughput of a transport direction is calculated by the transmitting/receiving device sending frames in the transport direction, the throughput being calculated based on the number of frames transmitted per sliding second. Thus, the device transmitting frames in a transport direction knows in real-time the useful throughput in its transport direction. The device transmitting in the other direction knows the useful throughput in the other transport direction.

each transport direction has a predefined maximum throughput based on the maximum throughput of the bidirectional channel, the sum of the maximum transport throughput of each direction being less than or equal to the maximum throughput of the bidirectional channel. Thus, the use of the channel is optimized, the throughput of one transport direction being based on the throughput in the other transport direction. Further, this makes it possible to be able to favor one transport direction over another.

at the sending step, if the useful throughput of a transport direction reaches the maximum throughput of said transport direction, no frame is sent until the useful throughput of the transport direction is equal to the maximum throughput of the transport direction, the method for aggregating and regulating messages comprises, after the message receiving step, a step for identifying each message received, the step for identifying each message received comprising the allocation of a priority to each message received based on at least one piece of information identified in the message. Thus, a priority is automatically allocated to each incoming message based on at least one datum it is transporting.

the information identified is the message type. Thus, a priority is automatically allocated to the message based on its type.

the number of queues defined by each transmitting/receiving device for each pair of nodes is greater than or equal to two, and the priority level of each queue after the second queue is lower than the priority level of the previous queue. Thus, it is possible to manage several priority levels, in particular several priorities for messages of the same type.

the frames have a predefined size equal to the size of the payload of a transmission unit of the transport layer used. Thus, the frames have the maximum physical transmission size possible. The calculation is performed without fragmentation to prevent having physical-level fragmentation and network-level fragmentation, thereby simplifying the reconstruction operations.

the packets have a predefined size so that one frame may comprise a multiple number of packets of the number of network node pairs. Thus, fair processing is possible when messages arrive from nodes belonging to all pairs of network nodes.

that the time interval for sending a number of frames is identical for each transport direction in the bidirectional channel. Thus, the total useful throughput is managed simply based on the useful throughput of each transport direction.

the time interval for sending a number of frames is predefined based on the maximum throughput of the bidirectional channel and on the predefined size of a frame.

the time interval for sending a number of frames is selected from a predefined and configurable list of time intervals based on the performance of a network host, the time interval being selected in the predefined list of time intervals as being the time interval directly less than the result of dividing the size of a frame by the maximum throughput of the bidirectional channel. Thus, the value of the interval is slightly more efficient in relation to the "desired" throughput from the viewpoint of the physical conditions of the network.

the packets are inserted in the frames in a balanced manner between the pairs, for example according to a round-robin type algorithm. Thus, it is possible to ensure the fair processing of messages of identical priority from nodes belonging to different pairs in the network.

each packet comprises a segment of data belonging to a message, an identifier for the pair of nodes to which the message belongs, a priority level, a type of packet data, an identifier for the segmented packet data, the number of remaining packets whose data belong to the same message as the packet data. Thus, the message can be reconstructed without difficulty once all the packets have been transported by the channel.

the method comprises an additional step of inserting into a frame, after the frame creation step, a status packet from the transmitting/receiving device transmitting said frame, bound for the other transmitting/receiving device receiving said frame. Thus, each transmitting/receiving device knows the useful throughput in the two transport directions and can adjust the useful throughput in its transmission direction.

the status packet of the transmitting/receiving device comprises information about the status of the pairs of network nodes, information about the filling status of the queues for each pair of nodes, and information about the estimated useful throughput in the transport direction corresponding to the transport direction in which the transmitting/receiving device sends frames.

the transport protocol used is selected from the TCP or UDP protocol.

Another aspect of the invention relates to a communication system comprising two transmitting/receiving devices communicating via a bidirectional channel having a maximum throughput, the bidirectional channel facilitating the transport of data in a first direction and in a second direction opposite to the first direction, each transmitting/receiving device being configured to implement the steps of the method according to one or more embodiments of the invention.

Each transmitting/receiving device of the communication system according to one or more embodiments of the invention may further comprise:
- a transmitting/receiving interface, configured to implement the step for receiving a plurality of messages from a node of the plurality of nodes,
- a data management module configured to implement the steps for segmenting messages, for allocating packets to a queue, for creating frames and for inserting packets of queues in the frames,
- a regulation module configured to implement the step for sending frames through the bidirectional channel.

One or more embodiments of the invention are particularly adapted to multi-point communication via gateways of constrained networks and with limited throughput such as in "real-time" defense confidential networks with considerable isolation constraints, radio networks with fixed bandwidth (with "TDM": "Time-Division Multiplexing") or even satellite networks with payment for throughput consumed or capped bandwidth.

The invention and its different applications will be better understood after reading the following disclosure and examining the accompanying figures.

BRIEF DESCRIPTION OF THE DRAWINGS

The figures are presented by way of reference and are in no way limiting to the invention.

DETAILED DESCRIPTION OF THE INVENTION

The figures are presented by way of reference and are in no way limiting to the invention.

Unless otherwise stated, the same element appearing in different figures has the same reference.

Figure 1:
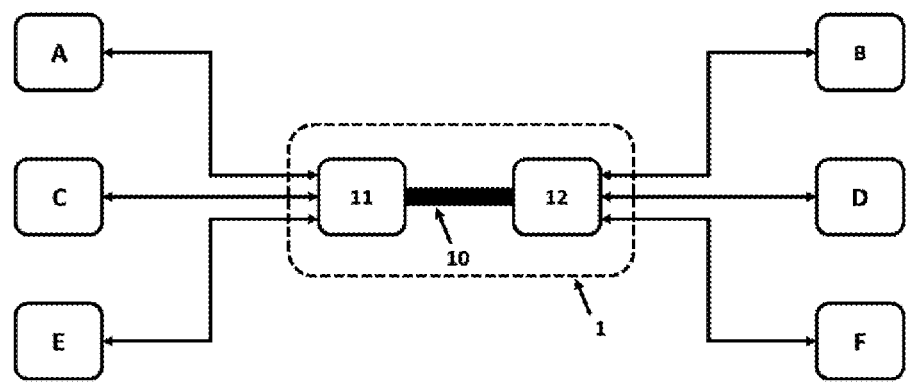
FIG. 1 shows a schematic depiction of a network comprising the system for aggregating and regulating messages according to an embodiment of the invention.

FIG. 1 shows a schematic depiction of a network comprising the system for aggregating and regulating messages according to an embodiment of the invention.

The system for aggregating and regulating messages 1 according to an embodiment of the invention comprises two transmitting/receiving devices 11 and 12. The two transmitting/receiving devices 11 and 12 communicate via a constrained bidirectional channel 10. The bidirectional channel 10 comprises two data transport directions, one transport direction enabling the transport of data from the transmitting/receiving device 11 to the transmitting/receiving device 12, the other transport direction, opposite to the first transport direction, enabling the transport of data from the transmitting/receiving device 12 to the transmitting/receiving device 11. The bidirectional channel 10 is full duplex, i.e. it enables data to be exchanged in each transport direction at the same time. Each transport direction has a fixed maximum throughput. Such a bidirectional channel is "constrained" as it has a maximum throughput. The maximum throughput of each transport direction is half the maximum throughput of the channel when the two transport directions are used equally, or based on the use of each transport direction.

The transmitting/receiving devices 11 and 12 can be any device enabling the transmission and reception of data via the constrained bidirectional channel 10. For example, in the case where the constrained bidirectional channel is a secure IP connection, the transmitting/receiving devices 11 and 12 are for example computers, servers, or any other processing system comprising an Ethernet network interface. The transmitting/receiving devices 11 and 12 are network interconnection points.

The network to which the system for aggregating and regulating messages 1 belongs further comprises a plurality of application nodes, each node belonging to a pair of nodes. A pair of nodes links two nodes which intercommunicate. For example, a pair of nodes A-B comprises nodes A and B as depicted in FIG. 1. Another pair of nodes C-D comprises nodes C and D as depicted in FIG. 1. Finally, another pair of nodes E-F comprises nodes E and F as depicted in FIG. 1. The nodes of the communication network can be any entity able to communicate via the network, i.e. any entity comprising an interface with the network, for example an application. Thus, in the case of an IP ("Internet protocol") network, any entity able to communicate via the IP protocol is a node.

In FIG. 1, nodes A to F can belong to the same network, or to two different communication networks, for example to a first communication network comprising nodes A, C and E and to a second communication network comprising nodes B, D and F. The transmitting/receiving devices 11 and 12 can respectively belong to the first and to the second network or to one of the two networks. Subsequently, it will be considered that all of nodes A to F and the transmitting/receiving devices 11 and 12 all belong to the same network, although one or more embodiments of the invention may cover more cases.

Embodiments of the invention can be implemented in any network using the Internet protocol suite ("IP" for "Internet Protocol"), implementing for example UDP (User Datagram Protocol) or TCP (Transmission Control Protocol) transport protocols. Embodiments of the invention can also be implemented in a radio network comprising a constrained bidirectional channel, for example fixed bandwidth radio networks (TDM), for example a network according to the GSM (Global System for Mobile communications) standard. Embodiments of the invention can also be implemented in a satellite network comprising a constrained bidirectional channel. Embodiments of the invention can in fact be implemented in any network comprising a constrained bidirectional channel.

Figure 2:
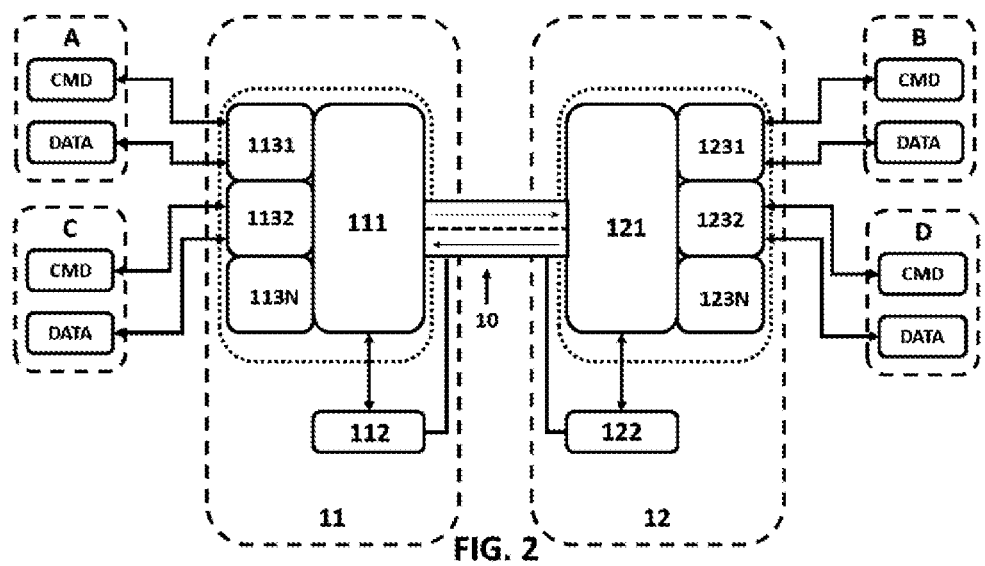
FIG. 2 shows a detailed schematic depiction of the system for aggregating and regulating messages according to an embodiment of the invention.

FIG. 2 shows a detailed schematic depiction of the system for aggregating and regulating messages according to an embodiment of the invention.

The system for aggregating and regulating messages according to one or more embodiments of the invention comprises the two transmitting/receiving devices 11 and 12. Each transmitting/receiving device 11 and 12 comprises a transmitting/receiving interface 113, configured to receive a plurality of messages from nodes of the plurality of nodes A to F. The transmitting/receiving interface 113 is represented in several parts 1131 to 113N and 1231 to 123N, in the case where it communicates with N nodes of the network to facilitate understanding. Each node can thus send data to the transmitting/receiving device 11 or 12, depending on its position, and receive data from the same transmitting/receiving device 11 or 12. For example, nodes A and C can communicate with the transmitting/receiving device 11 and nodes B and D can communicate with the transmitting/receiving device 12.

Each node can send messages of different types. For ease of understanding, FIG. 2 only shows two types CMD and DATA, but one or more embodiments of the invention may cover all cases where the nodes send messages of more than two types or only send messages of one same type. In the remainder of the description, the nodes send messages of a first CMD "command" type which are for example signaling messages, and messages of a second DATA type, which are for example messages transporting data. For the remainder of the description, it will be considered that the CMD command type messages have a higher priority than DATA type messages. The priority level of the different types can be defined by configuring the transmitting/receiving devices 11 and 12 as explained hereinafter. The priority level depends on the data and the network. Thus, messages of a same type may have different priorities, as explained hereinafter.

The transmitting/receiving devices 11 and 12 each comprise a data management module 111 and 121 configured to implement the steps for segmenting messages, for allocating packets to a queue, for creating frames and inserting packets of queues in the frames of the method according to an embodiment of the invention. The method according to one or more embodiments of the invention and its steps will be expanded hereinafter. The data management module 111 and 121 can be a physical module, comprising for example a memory and a processor configured to implement the instructions stored in the memory, or a software module, or a combination of the two.

The transmitting/receiving devices 11 and 12 each comprise a regulation module 112 and 122 configured to manage the sending of frames via the constrained bidirectional channel 10 and to manage the throughputs of the channel 10 in each of its directions of transport.

The regulation modules 112 and 122 of each of the transmitting/receiving devices 11 and 12 manage the sending of frames by giving instructions respectively to the data management modules 111 and 121, the data management modules 111 and 121 being responsible for sending data via the constrained bidirectional channel 10 and receiving data sent by the data management module of the other transmitting/receiving device 11 or 12.

Figure 3:
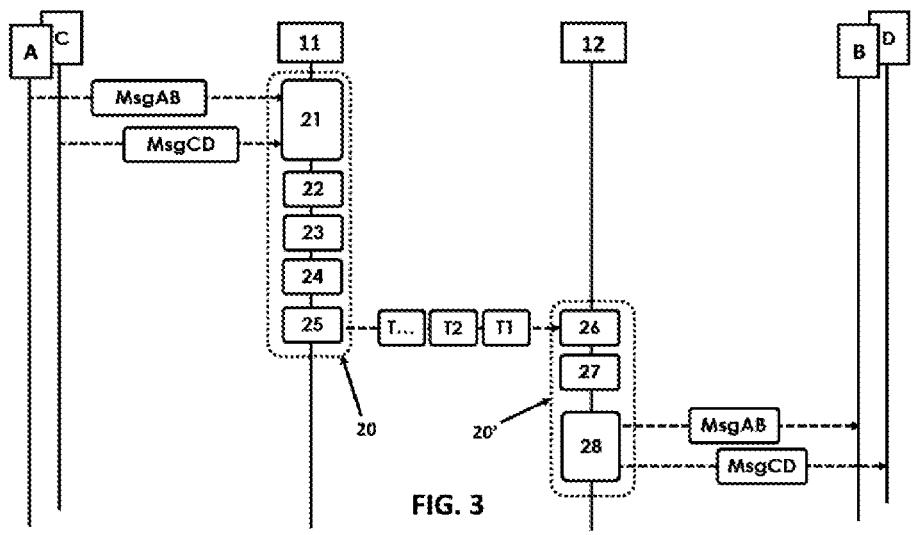
FIG. 3 shows a schematic depiction of exchanges between the network entities during the implementation of the method for aggregating and regulating messages according to an embodiment of the invention.

FIG. 3 shows a schematic depiction of the exchanges between the network entities during the implementation of the method for aggregating and regulating messages according to an embodiment of the invention.

A first embodiment of the method 20 for aggregating and regulating a message according to the invention is depicted in FIG. 3, by virtue of the representation of exchanges between the different entities. Two data exchanges, between node A and node B belonging to the pair of nodes A-B, and between node C and node D belonging to the pair of nodes C-D are depicted in FIG. 3. In the depiction of FIG. 3, the transmitting/receiving device 11 implements the method 20, as it only shows data exchanges in one direction, nodes A and C to nodes B and D, to facilitate understanding. However, the transmitting/receiving devices 11 and 12 can both implement, simultaneously, the method 20. Thus, what is described hereinafter implemented by the transmitting/receiving device 11 applies mutatis mutandis to the transmitting/receiving device 12, with modified references.

In a first step 21 of the method 20, the transmitting/receiving device 11 receives a plurality of messages Msg from nodes A and C, via its transmitting/receiving interfaces 113 and in particular 1131 and 1132. Such messages may be of the CMD "command" type or DATA type, of the same or different types. This reception 21 results from sending a message MsgAB from node A to node B and a message MsgCD from node C to node D, the messages having to pass via the transmitting/receiving devices 11 and 12 and therefore via the constrained bidirectional channel 10.

A second step of the method 20 comprises segmenting each message received into packets of a predefined size. Each step is notably represented in FIG. 4.

Figure 4:
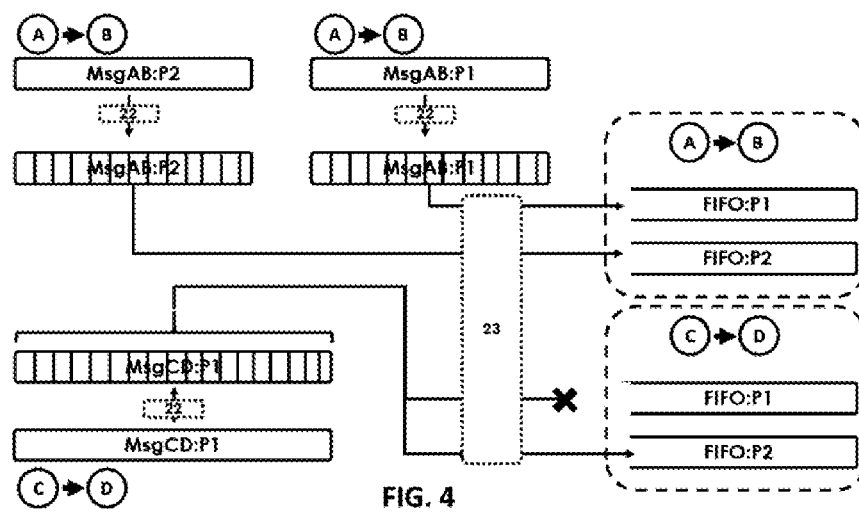
FIG. 4 shows a schematic depiction of the steps for segmenting messages and inserting packets into queues according to the method for aggregating and regulating messages according to an embodiment of the invention.

FIG. 4 shows a schematic depiction of the steps for segmenting messages and inserting packets into queues according to the method for aggregating and regulating messages according to an embodiment of the invention.

As shown in FIG. 4, each message received is segmented into packets in step 21. Later on in the method, these packets will be inserted in queues then, from the queues, will be inserted in frames. The predefined size of the packets depends on the predefined size of the frames. Thus, the predefined size of the packets will be discussed hereinafter.

This segmentation step makes it possible to manage more effectively the various throughputs later, preventing congestion at the level of the transmitting/receiving devices 11 and 12 and of the constrained bidirectional channel 10.

Referring to FIG. 3, the method 20 then comprises a step 23 for inserting packets resulting from the segmentation of messages in step 22 in queues.

The queues are defined in the data management module 111. A "queue" is a mechanism for which any object having been inserted first in the mechanism exits first. These queues are also called "FIFO" (First In First Out). In step 23, the packets are inserted into these queues. Thus, the first packet inserted into such a queue, or FIFO, will leave it first. The second packet inserted in a FIFO will leave it second, and so on.

The data management module 111 defines, for each pair of nodes, several queues. Thus, for the pair of nodes A-B, the data management module 111 defines at least two queues P1 and P2, each queue being associated with a priority, as depicted in FIG. 4.

In FIG. 4, the data management module 111 fills the queues it defines with packets segmented in step 22, based on the priority of the messages creating the packets. For example, for a P1 priority message MsgAB:P1, i.e. high priority, the packets resulting from the segmentation of this message will be inserted into the FIFO queue of the A-B pair associated with the highest priority P1. Such a message MsgAB: P1 is for example a CMD "command" type message, to which the data management module 111 has allocated a high priority P1. This allocation of a priority to a type of message can be performed during a message identification step (not shown), comprising identification of the message based on at least one piece of message information. This identification step is performed between the receiving step 21 and the segmentation step 22. This identification step can further make it possible to know to which pair of nodes belong the transmitter and recipient nodes, and obtain information about the size of the message for example. The insertion of step 22 is carried out provided that the queue FIFO:P1 is not full. In the example depicted in FIG. 4, the packets resulting from the segmentation of the message MsgAB:P1 may all be inserted into the queue FIFO:P1.

For the P2 priority message MsgAB:P2, i.e. lower priority than the P1 high priority, the packets resulting from the segmentation of this message will be inserted into the FIFO queue of the A-B pair associated with the P2 lower priority than the P1 high priority. Such a message MsgAB:P2 is for example a DATA type message, to which the data management module 111 has allocated P2 priority. In the example depicted in FIG. 4, the packets resulting from the segmentation of the message MsgAB:P2 can all be inserted into the queue FIFO:P2.

Without departing from the invention, each transmitting/receiving device 11 and 12 can define a plurality of priorities, greater than the number of priorities depicted in the Figures. The number of priorities is equal for each of the transmitting/receiving devices 11 and 12.

For the P1 priority message MsgCD:P1, i.e. high priority, the packets resulting from the segmentation of this message should be inserted into the FIFO queue of the C-D pair associated with the P1 high priority. Such a message MsgCD:P1 is for example a CMD "command" type message, to which the data management module 111 has allocated a P1 priority. In the example depicted in FIG. 4, the number of packets resulting from the segmentation of the message MsgCD:P1 exceeds the maximum number of packets permitted for CMD "command" type messages and cannot be inserted into the high priority FIFO:P1 queue. Due to this lock, one or more embodiments of the invention make it possible to guarantee minimum transmission latency for all pairs and avoid congestion at the level of the channel 10. The rejected packets, i.e. the packets resulting from the segmentation of the message MsgCD:P1, are relegated and inserted into the FIFO queue of the C-D pair directly from P2 lower priority to P1 high priority.

Figure 5:
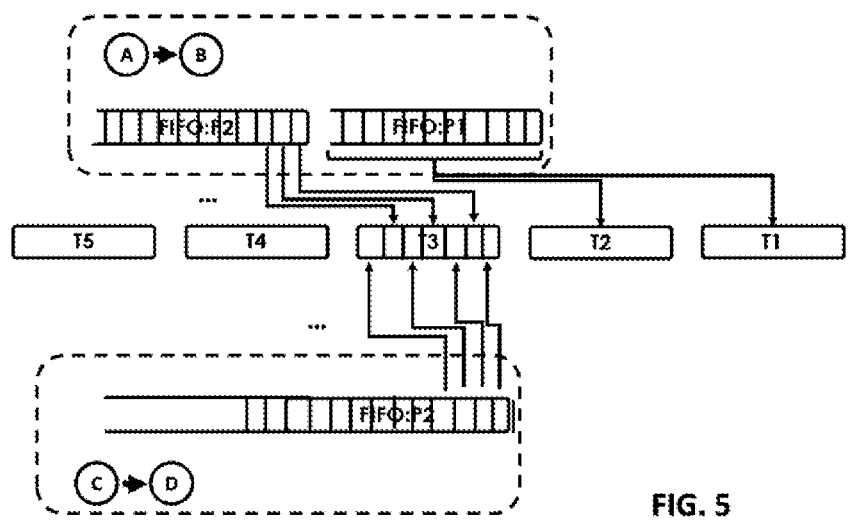
FIG. 5 shows a schematic depiction of the step for inserting packets of queues in frames according to the method for aggregating and regulating messages according to an embodiment of the invention.

In a step 23, depicted in FIG. 3 and FIG. 5, frames of a predefined size are created and the packets allocated to queues are inserted into the frames, the insertion of the packets allocated to the first high priority queue being performed before the insertion of packets allocated to the second lower priority queue, the insertion being performed in the frame transmission order.

FIG. 5 shows a schematic depiction of the step for inserting packets of queues into frames according to the method for aggregating and regulating messages according to an embodiment of the invention.

As depicted in FIG. 5, the step 24 for inserting packets allocated to queues into frames is performed according to a sequence described hereinafter:

Firstly, in a first sub-step of step 24, a number of frames is created based on the number of packets. The frames have a predefined fixed size. In one or more embodiments, the frames may have a size equal to the size of the payload of a transmission unit for the transport layer used. For example, if the transport layer uses UDP and the network layer IP, the payload of a transmission unit is 1472 bytes, obtained by subtracting IP/UDP headers of 28 bytes at MTU (Maximum Transmission Unit) for Ethernet (data and physical link layer) from a value of 1500 bytes. Thus, the frames have the maximum physical transmission size possible. The calculation is performed without fragmentation to prevent having physical-level fragmentation and network-level fragmentation, thereby simplifying the reconstruction operations. Once the size of the frames is predefined, for example during an initialization step (not shown), the size of packets may be defined.

The packets have a predefined size so that the ratio between the total number of control bytes and the total number of bytes of the payload of a frame is minimized, less than 10% for example. In order to maintain processing fairness by the transmitting/receiving devices 11 and 12 of the various nodes and pairs of nodes of the network, within the same time interval, the packets of messages from each of the pairs of nodes of the network are inserted in a frame, or several successive frames if the number of pairs of nodes is substantial. Each packet comprises at least one segment of data belonging to a message, an identifier for the pair of nodes to which the message belongs, a priority level, a type of packet data, an identifier for the segmented packet data, the number of remaining packets whose data belong to the same message as the packet data. The size of the packets may also be predefined during an initialization step (not shown). Reinitialization is also possible, automatically or otherwise, based on the changes in the network or the needs of the network nodes.

In one or more embodiments, messages having a high priority may have a maximum predefined size, in order to guarantee low latency for sending high priority messages regardless of the pair, for example the size or one or two packets. When a high priority message is received in step 21 by the transmitting/receiving device 11 or 12, and the size of said message is greater than the maximum predefined size for a high priority packet, the entire message is downgraded to an immediately lower priority, for example from P1 priority to P2 priority. Alternatively, one or more embodiments of the invention may provide for the sending of an error message.

A second sub-step of step 24 comprises inserting packets of queues of the highest priority into the frames created. The first frames created thus comprise packets with the highest priority messages.

The packets are distributed one by one in the frames, or in groups of small numbers of packets, by alternating equally between the queues. In the example of FIG. 5, only one P1 priority FIFO queue exists, the FIFO:P1 queue of the pair of A-B nodes. Thus, the frames T1 and T2 only comprise packets from the FIFO:P1 queue of the pair of A-B nodes. In FIG. 5, the packets in the FIFO:P1 queue of the pair of A-B nodes are inserted into the frames T1 and T2.

A following sub-step of step 24 comprises inserting packets from queues with a priority directly below the previous priority into the frames. This sub-step 24 is only performed when all the queues of higher priority are empty.

For example, as depicted in FIG. 5, the priority directly below P1 high priority is P2 priority. The packets from P2 priority FIFO queues of each of the pairs of nodes A-B and C-D are inserted into frames T3 to T5 alternating equally between the queues. To do this, an indicator, by FIFO priority, is used to target the last pair positioned. The indicator corresponds to a pointer and makes it possible to avoid favoring some pairs over others. This enables fair processing of each pair of nodes without favoring one over the other. Although only alternate filling of frame T3 is depicted in FIG. 5 for greater clarity, the following frames T4 and T5 also accept packets from queues FIFO:P2AB and FIFO:P2CD. The insertion into frames T4 and T5 is also performed by alternating the packets in the two queues.

Figure 6:
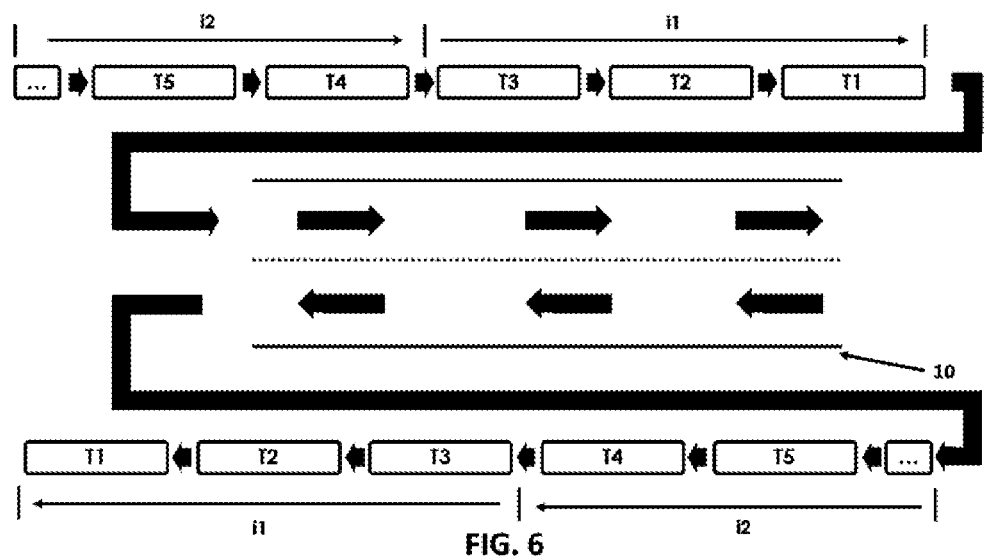
FIG. 6 shows a schematic depiction of the step for sending frames via the constrained bidirectional channel according to the method for aggregating and regulating messages according to the invention, as well as receiving frames via the constrained bidirectional channel.

FIG. 6 shows a schematic depiction of the step for sending frames via the constrained bidirectional channel according to the method for aggregating and regulating messages according to an embodiment of the invention, as well as for receiving frames via the constrained bidirectional channel.

Once the frames have been filled, i.e. the packets have been inserted therein, they are sent, in their filling order, via the bidirectional channel to the other transmitting/receiving device, for example the transmitting/receiving device 12 in FIG. 3, in step 25. Thus, the frames filled first will be sent first.

The sending is performed over a predefined time interval i. Over the predefined time interval i, a defined number of frames is sent, the number of frames sent over the time interval being dependent on the maximum throughput of the bidirectional channel 10 and on the useful throughput in each of the transport directions of the bidirectional channel 10.

The time interval i is identical for each transport direction in the constrained bidirectional channel 10. It is predefined based on the maximum throughput of the bidirectional channel and on the predefined size of a frame. The time interval i is selected from a predefined list of time intervals based on the performance of a network host, the time interval being selected in the predefined list of time intervals as being the time interval directly less than the result of dividing the size of a frame by the maximum throughput of the bidirectional channel. The range of values depends on the performance of the target (CPU, peripherals, network host), the performance of the physical transmission layer and the minimum desirable latency to be achieved. It is for example possible to view the range of values as being stages, for example compatible with the system's hardware clocks, easier to manage and analyze than a calculated value. For example, it is possible to define the following time interval range i: i_ARRAY={1.0, 2.5, 5.0, 10.0}.

The time interval is calculated then rounded down to the lower value of the time interval range i_ARRAY.

The calculation may for example be the result of dividing the size of a frame by the maximum throughput of the constrained bidirectional channel 10. For example, with a maximum throughput of 512000 bps and a frame size of 1472 bytes, the calculation gives (1472*8)/512000=23 ms. Therefore the directly lower value is selected in the time interval range i_ARRAY i.e a time interval i=10 ms. Thus, the value of the interval is slightly more efficient in relation to the required throughput from the viewpoint of physical conditions. The value of the interval can be set during the initialization step (not shown).

Frames are sent in each predefined time interval i1 to iN for N intervals. In one or more embodiments, a number of frames to be sent may be predefined, for example during the initialization step, for example set at 1, i.e. a frame to be sent per time interval i. When sending frames, the number of frames sent over the time interval is based on the maximum throughput of the bidirectional channel 10 and on the useful throughput in each of the transport directions of the bidirectional channel, i.e. every sliding second the regulation module 112 measures the number of frames sent, and compares it to the maximum throughput of the constrained bidirectional channel 10 and to the useful throughput in the other transport direction. If the time interval i is determined at the minimum and this interval does not make it possible to reach the maximum throughput of the transport direction, the number of frames sent for each time interval i is increased incrementally until the expected throughput is reached, i.e. there is temporarily more than one frame sent per time interval i even though the number of a frame per time interval i has been predefined at initialization.

The number of frames sent over the time interval i is increased if the sum of the useful throughput of the two transport directions of the bidirectional channel is less than the maximum throughput of the bidirectional channel. Further, if the useful throughput of a transport direction reaches the maximum throughput of said transport direction, no frame is sent until the useful throughput of a transport direction is equal to the maximum throughput of the transport direction. The maximum throughput of a transport direction can be adapted based on the useful throughput of each of the two transport directions. Thus, if, in its transport direction corresponding to its sending direction, the regulation module 112 observes that more throughput is required and it knows that the other transport direction is using less throughput than its maximum throughput, i.e. that the constrained bidirectional channel is not used at its maximum throughput, the regulation module 112 can increase the maximum throughput over its transport direction corresponding to its sending direction and inform the other regulation module 122 thereof.

To inform the other regulation module 122 thereof, the method may comprise an additional step for inserting into a frame, after the frame creation step, a status packet from the transmitting/receiving device 11 transmitting said frame, bound for the other transmitting/receiving device 12 receiving said frame. Thus, each transmitting/receiving device 11 and 12 knows the useful throughput in the two transport directions and can adjust the useful throughput in its transmission direction. The status packets of the transmitting/receiving devices 11 and 12 may for example comprise information about the status of the node pairs of the network, information about the filling status of the queues of each pair of nodes, and information about the estimated useful throughput in the transport direction corresponding to the transport direction in which the transmitting/receiving device sends frames.

Thus, each regulation module knows the full status of the constrained bidirectional channel 10 and can adjust the number of frames sent per time interval i to manage the throughput in each of the transport directions.

After sending, the transmitting/receiving device at the other output of the channel 10 receives the frames, as shown in FIG. 6, in a step 26 of the method 20'. The method 20' is implemented by the transmitting/receiving device which has not transmitted the frames, i.e. receiving the frames, in order to reform the messages and send them to the recipient node. In step 27, the data management module 121 of the transmitting/receiving device 12 desegments, i.e. it recreates messages from packets of frames received, the packets comprising the information necessary to recreate messages as previously shown. In step 28, the transmitting/receiving device 12 receiving frames sends, via its transmitting/receiving interface 123, the messages recreated at their recipient node.

Thus, one or more embodiments of the invention make it possible to manage, in real-time or in near real-time, the throughput in each of the transport directions of a bidirectional channel 10 having a maximum throughput, whilst taking into account the priority of the messages and without losing information.

What is claimed is:

1. A method for aggregating and regulating messages in at least one network comprising
a plurality of nodes distributed in pairs of nodes and
at least two transmitting/receiving devices, the at least two transmitting/receiving devices communicating via a bidirectional channel having a defined maximum throughput, the bidirectional channel enabling transport of data in a first direction and in a second direction opposite to the first direction, each direction having a useful throughput, each transmitting/receiving device defining queues, each pair of nodes of the pairs of nodes having a plurality of queues allocated, each plurality of queues allocated to a pair of nodes comprising at least a first queue and a second queue, the first queue having a high priority, the second queue having a lower priority than the first queue,
the method being implemented by each of the at least two transmitting/receiving devices, the method comprising:
receiving a plurality of messages, wherein messages of the plurality of messages come from nodes of the plurality of nodes and are sent to other nodes of the plurality of nodes, wherein a destination node of each message of said messages belongs to a same pair of nodes as a node from which said each message originates,
segmenting said each message into packets of a predefined size,
allocating each packet of said packets resulting from segmenting said each packet to a queue depending on an origin, a destination and a priority of said each message,
creating a first frame and, if necessary, at least one second frame, the first frame and the at least one second frame having a predefined size, and insertion of packets of queues into at least the first frame and, if necessary, into the at least one second frame, the insertion of said packets allocated to a highest priority queue being performed before the insertion of said packets allocated to a lower priority queue, the insertion being performed initially into the first frame then, if necessary, into the at least one second frame,
sending, via the bidirectional channel over a predefined time interval, of the first frame then, if necessary, of the at least one second frame, the first frame and the at least one second frame being sent successively, a number of frames sent over a time interval being dependent on a maximum throughput of the bidirectional channel and on the useful throughput in each of transport directions of the bidirectional channel.

2. The method for aggregating and regulating messages according to claim 1, wherein said messages have a maximum predefined size by priority, and wherein in said allocating said each packet of said packets to said queue based upon the priority, if a size of a message to which the packets belong exceeds a maximum size for the priority, the packets of the message are allocated to a priority queue directly below a priority queue to which they have been allocated.

3. The method for aggregating and regulating messages according to claim 1, wherein in said sending of at least said first frame via the bidirectional channel, the number of frames sent over the time interval is increased if a sum of useful throughputs of two transport directions of the bidirectional channel is less than the maximum throughput of the bidirectional channel.

4. The method for aggregating and regulating messages according to claim 1, wherein the useful throughput of a transport direction is calculated by a transmitting/receiving device of said at least two transmitting/receiving devices sending frames in the transport direction, the useful throughput being calculated based on the number of frames transmitted per sliding second.

5. The method for aggregating and regulating messages according to claim 1, wherein each transport direction of said transport directions has a maximum predefined throughput based on the maximum throughput of the bidirectional channel, a sum of maximum transporting throughputs of said each transport direction being less than or equal to the maximum throughput of the bidirectional channel.

6. The method for aggregating and regulating messages according to claim 5, wherein in said sending, if the useful throughput of a transport direction of said transport directions reaches the maximum throughput of said transport direction, no frame is sent while the useful throughput of the transport direction is equal to the maximum throughput of the transport direction.

7. The method for aggregating and regulating messages according to claim 1, further comprising, after receiving the plurality of messages, identifying said each message received, wherein said identifying said each message received comprises allocation of a priority to said each message received based on at least one piece of information identified in said each message received.

8. The method for aggregating and regulating messages according to claim 7, wherein the at least one piece of information identified is a type of message.

9. The method for aggregating and regulating messages according to claim 1, wherein a number of queues of said queues defined by said each transmitting/receiving device for said each pair of nodes is greater than two, and in that a priority level of each queue of said queues after the second queue is less than a priority level of a previous queue.

10. The method for aggregating and regulating messages according to claim 1, wherein the predefined size of the first frame and the at least one second frame is equal to a size of a payload of a transmission unit for a transport layer used.

11. The method for aggregating and regulating messages according to claim 1, wherein the predefined size of the packets is such that a ratio between a total number of control bytes and a total number of bytes of a payload of a frame is less than 10%.

12. The method for aggregating and regulating messages according to claim 1, wherein the time interval for sending the number of frames is identical for each transport direction in the bidirectional channel.

13. The method for aggregating and regulating messages according to claim 1, wherein the time interval for sending the number of frames is predefined based on the maximum throughput of the bidirectional channel and on the predefined size of a frame.

14. The method for aggregating and regulating messages according to claim 13, wherein the time interval for sending the number of frames is selected from a list of predefined time intervals based on performance of a network host, the time interval being selected in a predefined list of time intervals as being the time interval directly less than a result of dividing a size of a frame by the maximum throughput of the bidirectional channel.

* * * * *